United States Patent
Duroux et al.

(10) Patent No.: US 6,592,255 B1
(45) Date of Patent: Jul. 15, 2003

(54) TEMPERATURE INDICATOR FOR MOTOR VEHICLE

(76) Inventors: Bernard Duroux, 19 Domaine de la Boissiere, 78890 Garancieres (FR); Daniel Dumont, 19 Rue Rosa Bonheur, 77250 Veneux-les-Sablons (FR)

(*) Notice: Subject to any disclaimer, the term of this patent is extended or adjusted under 35 U.S.C. 154(b) by 0 days.

(21) Appl. No.: 09/404,042

(22) Filed: Sep. 23, 1999

(30) Foreign Application Priority Data

Sep. 23, 1998 (GB) .............................................. 9820619

(51) Int. Cl.⁷ ............................ G01K 11/12; B60R 1/12
(52) U.S. Cl. ....................... 374/162; 374/109; D12/187
(58) Field of Search .......................... 374/16, 17, 109, 374/141, 161, 162, 150, 157; 116/216; D12/187, 188; B60R 1/12

(56) References Cited

U.S. PATENT DOCUMENTS

| | | | | | |
|---|---|---|---|---|---|
| 2,638,785 | A | * | 5/1953 | Vacanti et al. | 374/206 |
| 3,590,371 | A | * | 6/1971 | Shaw, Jr. | 324/505 |
| 3,704,625 | A | * | 12/1972 | Seto et al. | 374/162 |
| 4,182,182 | A | * | 1/1980 | Stortz | 374/162 |
| 4,336,712 | A | * | 6/1982 | Hawkins | 374/138 |
| 4,445,787 | A | * | 5/1984 | Parker | 374/141 |
| 4,634,835 | A | * | 1/1987 | Suzuki | 219/202 |
| 4,878,588 | A | * | 11/1989 | Ephraim | 215/11.2 |
| 4,933,525 | A | * | 6/1990 | Phillips | 219/725 |
| 5,307,211 | A | * | 4/1994 | Schmidt et al. | 359/868 |
| 5,738,442 | A | * | 4/1998 | Paron et al. | 374/162 |
| 5,772,328 | A | | 6/1998 | Kronberg | |
| 5,805,367 | A | * | 9/1998 | Kanazawa | 359/267 |
| 6,106,121 | A | * | 8/2000 | Buckley et al. | 349/11 |

FOREIGN PATENT DOCUMENTS

| | | | | |
|---|---|---|---|---|
| DE | 2606692 A1 | | 8/1977 | |
| DE | 2748023 | * | 7/1978 | 374/162 |
| DE | 3232260 A | | 3/1984 | |
| DE | 3232260 A1 | | 3/1984 | |
| DE | 3314515 A1 | | 10/1984 | |
| DE | 3314515 A1 | * | 10/1984 | 374/141 |
| DE | 3927753 A1 | | 2/1991 | |
| DE | 19631728 A | | 2/1998 | |
| EP | 0864465 A2 | | 9/1998 | |
| FR | 2 386 028 | | 10/1978 | |
| FR | 2386028 A | | 10/1978 | |
| FR | 2507318 | * | 12/1982 | 374/162 |
| FR | 2597044 A2 | * | 10/1987 | B60R/1/08 |
| FR | 2700622 A | | 7/1994 | |
| GB | 1029605 | * | 5/1966 | 374/162 |
| GB | 2085585 | * | 4/1982 | 374/162 |
| GB | 2092082 A | | 8/1982 | |
| GB | 2092082 A | * | 8/1982 | |
| GB | 2165646 | * | 4/1985 | 374/162 |
| GB | 2250250 A | * | 3/1992 | B60R/1/08 |
| JP | 05187924 | | 7/1993 | |
| JP | 08188088 A | * | 7/1996 | B60R/1/06 |
| JP | 10113262 A | * | 5/1998 | A47G/1/00 |

* cited by examiner

Primary Examiner—Diego Gutierrez
Assistant Examiner—Lydia M. DeJesús
(74) Attorney, Agent, or Firm—Jones Day

(57) ABSTRACT

A temperature indicator for a motor vehicle arranged to indicate, to the driver of the vehicle, the ambient temperature either inside or outside the vehicle. The temperature indicator comprises thermochromic material (36–46) applied to the reflective member (30) of a rear view mirror (10) and arranged in a line, locations along which are arranged to change colour at successively increasing temperatures. The line of thermochromic material (36–46) may be positioned to separate zones (32, 34) of the reflective member which differ in curvature.

36 Claims, 1 Drawing Sheet

TEMPERATURE INDICATOR FOR MOTOR VEHICLE

FIELD

This invention relates to a temperature indicator for a motor vehicle arranged to indicate, to the driver of the vehicle, the ambient temperature either inside or outside the vehicle, the temperature indicator comprising thermochromic material applied to a reflective member of a rear view mirror and positioned so as to be visible to the driver of the motor vehicle.

RELATED ART

FR-A-2386028 discloses a temperature indicator of this type in which the mirror glass of an exterior mirror has a coating which is clear and transparent when a threshold temperature is exceeded and which becomes opaque or coloured at temperatures below this threshold.

SUMMARY OF THE INVENTION

According to the invention, in a temperature indicator of the type described above, the thermochromic material is arranged in a line, locations along which are arranged to change colour at successively increasing temperatures.

The successively increasing temperatures may be in accordance with a standard scale, for example °C.

The invention also provides a rear view mirror having a temperature indicator of the type described above.

DETAILED DESCRIPTION OF THE PREFERRED EMBODIMENT

Figure 1:
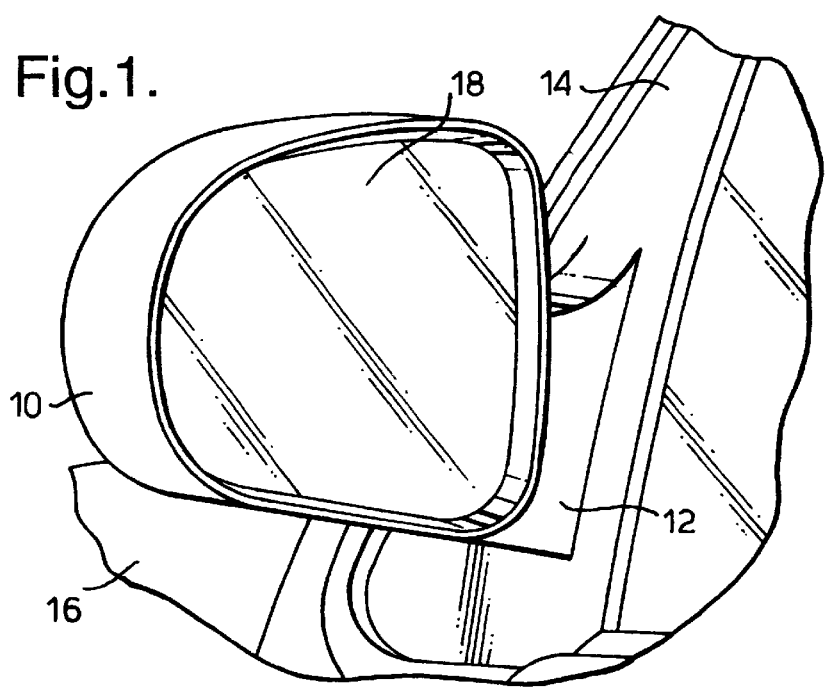
FIG. 1 is a perspective view of an exterior mirror for a motor car having a temperature indicator in accordance with the invention.

Referring to FIG. 1, a rear view mirror having a case 10 and a bracket 12 is mounted on a door 14 of a motor car 16. The case 10 contains a mirror glass 18.

Figure 2:
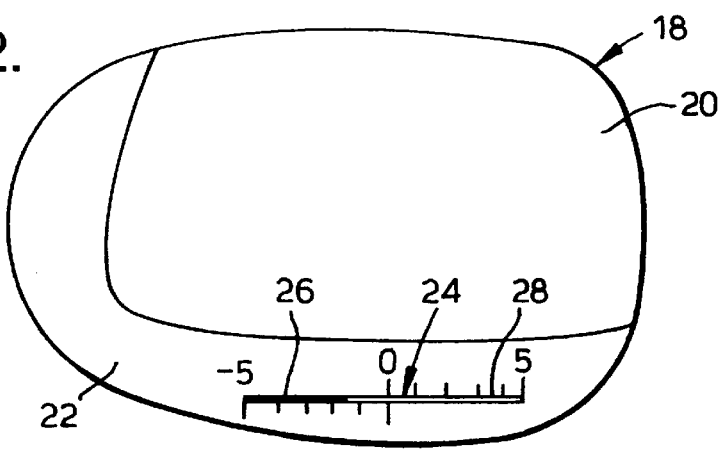
FIG. 2 is an elevational view of a first alternative mirror glass in accordance with the invention for use with the mirror shown in FIG. 1.

Referring to FIG. 2, the mirror glass 18 has a main zone 20, the dimensions of which are sufficient to provide the legally required field of view as described in EP-A-0860323. The zone 20 is surrounded on its outboard and bottom edges by an L-shaped zone 22 of greater radius of curvature. The outboard part of the zone 22 provides a view of the above mentioned "blind spot" while the bottom part thereof provides a view of the ground in the vicinity of the rear wheel of the car.

A strip 24 of thermochromic material is secured by adhesive to the second surface of the bottom part of the zone 22, before the reflective layer is applied to such second surface. The left-hand part of the strip 24 has a first colour 26 while the right-hand part has a second colour 28. The proportion of the strip with the colour 26 increases within increasing temperature. Scale markings are engraved on the mirror glass 20 to enable to temperature to be read from the boundary between the part with the colour 26 and the part with the colour 28. In the drawing, the temperature indicated is minus 1.5° centigrade, the scale markings extending from −5° C. to +5° C. The entire strip takes up the first colour 26 when the temperature is above +5° C. The entire strip takes up the second colour 28 when the temperature is below −5° C. The strip 24 thus informs the driver whether there is a risk of ice on the road.

Figure 3:
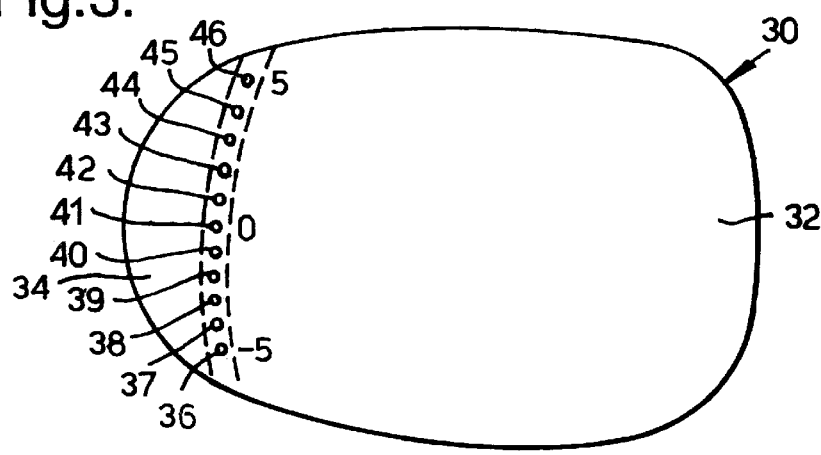
FIG. 3 is an elevational view, similar to FIG. 2, of a second alternative mirror glass for use in the mirror shown in FIG. 1.

FIG. 3 shows an alternative mirror glass 30 having a main zone 32 having a first curvature and an auxiliary zone 34 of greater curvature than the main zone 32 so as to extend the field of view into the so-called "blind spot" in which vehicles about to overtake are not visible, as described in EP-A-0864465. The boundary between the two zones 32 and 34 is marked by a row of eleven dots of thermochromic material 36–46. The dot 36 is arranged to change colour at −5° centigrade and each successive dot is arranged to change colour at a temperature of 1° centigrade higher than the next preceding so that the dot 46 changes temperature at +5° centigrade. Temperature indications −5, 0 and +5 are engraved on the mirror glass 30.

In both embodiments, the thermochromic material is a grafted chromic composite sold by Aimco S.A. (France) under the trademark "Retrogivre".

What is claimed is:

1. A rear view mirror including a transparent reflective member having front and rear surfaces and a reflective layer on said rear surface for reflecting images that are viewable through said front surface, and a temperature indicator of thermochromic material between said rear surface and said reflective layer, said thermochromic material changing to different colors at different temperatures.

2. The mirror of claim 1 wherein said thermochromic material comprises a plurality of adjacent locations of thermochromic material that change color at different temperatures.

3. The mirror of claim 2 including temperature scale indicia on said reflective member aligned with said thermochromic material.

4. The mirror of claim 1 wherein said thermochromic material is on a tape that is adhesively secured to said rear surface.

5. The mirror of claim 1 wherein said thermochromic material is in a line having a midpoint that is indicative of a freezing temperature, and said thermochromic material on opposite sides of said midpoint being indicative of temperatures above or below freezing.

6. A rear view mirror including a transparent reflective member having front and rear surfaces, said rear surface having a rear surface area, a temperature indicator of thermochromic material applied to and covering a small portion of said rear surface area and being viewable through said reflective member from said front surface thereof, said thermochromic material changing to different colors at different temperatures, and a reflective layer on the remainder of said rear surface area that is not covered by said temperature indicator for reflecting images that are viewable from said front surface.

7. The mirror of claim 6 including indicia on said front surface cooperating with said temperature indicator of thermochromic material, said indicia in combination with said temperature indicator informing a viewer whether the temperature is above or below 0° C.

8. The mirror of claim 7 wherein said indicia provides a temperature indication over a range that is not greater than −5° C. to +5° C.

9. The mirror of claim 7 wherein said indicia is etched on said front surface.

10. The mirror of claim 6 wherein said temperature indicator is a continuous strip of thermochromic material that exhibits one color above 0° C. and a different color below 0° C.

11. The mirror of claim 10 wherein said strip has opposite ends and progressively changes color at different temperatures from one end to the other end thereof.

12. The mirror of claim 11 wherein said strip changes color over a temperature range that is not greater than −5° C. to +5° C.

13. The mirror of claim 6 wherein said temperature indicator comprises a plurality of spaced-apart thermochromic material locations, each thermochromic material location changing color at a unique predetermined temperature from other thermochromic material locations.

14. The mirror of claim 13 wherein said thermochromic material locations include opposite end locations and said thermochromic material locations progressively change color at different temperatures from one of said end locations to the other of said end locations.

15. The mirror of claim 14 wherein said thermochromic material locations change temperature over a temperature range that is not greater than −5° C. to +5° C.

16. The mirror of claim 13 wherein said spaced-apart thermochromic material locations comprise a row of dots of thermochromic material, each dot changing color at a unique predetermined temperature from other dots.

17. The mirror of claim 13 including indicia on said reflective member that represents a temperature of 0° C., said thermochromic material locations extending on opposite sides of said indicia that represents a temperature of 0° C.

18. The mirror of claim 6 including indicia on said reflective member that represents a temperature of 0° C., said thermochromic material extending on opposite sides of said indicia that represents a temperature of 0° C.

19. The mirror of claim 18 wherein said indicia includes markings that indicate a temperature range that is not greater than −5° C. to +5° C.

20. The mirror of claim 18 wherein said thermochromic material has a length and changes color at different temperatures along the length thereof so that the demarcation between different colors cooperates with said indicia to indicate whether the temperature is above or below 0° C.

21. The mirror of claim 6 wherein said thermochromic material has opposite ends and progressively changes color at different temperatures from one end to the other end thereof.

22. The mirror of claim 6 wherein said thermochromic material changes color at different temperatures from one end to the other thereof over a temperature range that is not greater than −5° C. to +5° C.

23. The mirror of claim 6 wherein said thermochromic material has a length and changes color at different temperatures over the length thereof.

24. The mirror of claim 6 wherein said reflective member has an outer periphery that includes opposite ends, a top and a bottom, said thermochromic material being located on said rear surface of said reflective member adjacent said bottom thereof and being elongated in a direction between said opposite ends.

25. The mirror of claim 6 wherein said reflective member has an outer periphery that includes opposite ends, a top and a bottom, said thermochromic material being located on said rear surface of reflective member adjacent one of said opposite ends thereof and being elongated in a direction between said top and bottom.

26. The mirror of claim 25 wherein said thermochromic material extends along an elongated curved path.

27. The mirror of claim 6 wherein said thermochromic material is on a tape that is adhesively attached to said rear surface.

28. The mirror of claim 6 wherein said thermochromic material is covered by said reflective layer.

29. the mirror of claim 6 including indicia overlying said thermochromic material and indicating temperatures at, above and below 0° C.

30. An exterior rear view mirror for a motor vehicle operable by a driver, the mirror being positionable on a motor vehicle for the viewing of images therein by a driver of the vehicle, said mirror including a reflective member that reflects images that are viewable by a vehicle driver, said reflective member having a main zone with a first curvature and an auxiliary zone of greater curvature than said first curvature, said reflective member having a temperature indicator of thermochromic material thereon that is visible to a driver of the vehicle, said thermochromic material being arranged in a line that includes a plurality of locations that sequentially change color at increasing temperatures, and said thermochromic material being positioned to provide a line of demarcation between said main zone and said auxiliary zone.

31. A rear view mirror according to claim 30, wherein said thermochromic material locations change color over a temperature range of −5° C. to +5° C.

32. A rear view mirror according to claim 30, wherein said reflective member is made of transparent material having front and rear surfaces and said thermochromic material is on said rear surface of said reflective member.

33. A rear view mirror according to claim 32, wherein said thermochromic material locations change color over a temperature range of −5° C. to +5° C.

34. The mirror of claim 32 including indicia cooperating with said thermochromic material to indicate temperature over a temperature range that extends both above and below 0° C.

35. The mirror of claim 34 wherein said indicia is on said reflective member independently of said thermochromic material.

36. The mirror of claim 35 wherein said indicia is engraved on said reflective member.

* * * * *

UNITED STATES PATENT AND TRADEMARK OFFICE
CERTIFICATE OF CORRECTION

PATENT NO. : 6,592,255 B1 Page 1 of 1
DATED : July 15, 2003
INVENTOR(S) : Bernard Duroux and Daniel Dumont It is certified that error appears in the above-identified patent and that said Letters Patent is hereby corrected as shown below:

<u>Column 4,</u>
Line 8, after "surface of" insert -- said --
Line 18, change "the" to -- The --

Signed and Sealed this

Ninth Day of September, 2003

JAMES E. ROGAN
*Director of the United States Patent and Trademark Office*